United States Patent
Matthews

(10) Patent No.: US 6,400,776 B1
(45) Date of Patent: Jun. 4, 2002

(54) METHOD AND APPARATUS FOR HIGH SPEED DATA TRANSMISSION BY SPECTRAL DECOMPOSITION OF THE SIGNALING SPACE

(75) Inventor: Adrian S. Matthews, Middlesex, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/021,137

(22) Filed: Feb. 10, 1998

(51) Int. Cl.[7] .......................... H04L 27/36; H04L 27/18; H04L 27/20
(52) U.S. Cl. .......................... 375/298; 375/223; 375/308
(58) Field of Search .................................. 375/223, 222, 375/308, 296, 298, 329, 324, 332, 340, 348, 279, 280, 281, 284, 285, 261; 329/304; 332/103; 455/313, 314, 205, 207

(56) References Cited

U.S. PATENT DOCUMENTS

| | | | |
|---|---|---|---|
| 4,679,227 A | 7/1987 | Hughes-Hartogs | 375/223 |
| 4,731,816 A | 3/1988 | Hughes-Hartogs | 375/222 |
| 4,833,706 A | 5/1989 | Hughes-Hartogs | 375/222 |
| 5,838,727 A | * 11/1998 | Lyon et al. | 375/261 |
| 5,995,565 A | * 11/1999 | Tong et al. | 375/346 |

OTHER PUBLICATIONS

"Practical Generation of Spectrally Efficient Pulses", ICCC'85, Jun. 1985, pp. 18.2.1–18.2.5.
"Properties of the Eigenvectors of Persymmetric Matrices with Applications to Communication Theory", A. Cantoni and P. Butler, IEEE Trans. on Comm., vol. COM–24 No. 8, Aug. 1976, pp. 804–809.
"The Multitone Channel", IEEE Trans. Comm., vol. 37, No. 2, pp. 119–124, Feb. 1989.
"A 19.2 Kbps Voiceband Data Modem Based on Orthogonal Multiplexed QAM Techniques", ICC'85, Jun. 1985, pp. 21.1.1–21.1.5.
"Multicarrier Modulation for Data Transmission: An Idea Whose Time Has Come", J.A.C. Bingham, IEEE Comm. May 1990, pp. 5–14.
Irving Kalet; "The Multitone Channel"; IEEE Transactions On Communications, vol. 37, No. 2, Feb. 1989, pp. 119–124.

* cited by examiner

*Primary Examiner*—Betsy L. Deppe

(57) ABSTRACT

A method and apparatus of high speed multi-dimensional signaling, via a modem, has a processing method of utilizing prolate pulses to optimize transmission capacity of the transmission channel. The modem includes a process that segments the channel bandwidth and allocates the power and bit loading in relation to a measure of the noise in each spectral bin. Data are carried over a plurality of frequencies across the channel, and within each spectral bin, a plurality of orthogonal signaling dimensions.

5 Claims, 3 Drawing Sheets

METHOD AND APPARATUS FOR HIGH SPEED DATA TRANSMISSION BY SPECTRAL DECOMPOSITION OF THE SIGNALING SPACE

FIELD OF THE INVENTION

This invention is generally directed to high-speed data communication and more specifically to the area of high-speed modem design. It also concerns achieving high spectral efficiency in signaling systems.

BACKGROUND OF THE INVENTION

Due to present increased bandwith requirements there is a present need to simultaneously support voice, video and data applications at low BER (Bit Error Rates), using new modem designs operating for twisted pair wires at rates exceeding 10 Mbits/s at error rates better than $10^{-6}$. Using conventional Pulse Amplitude Modulation (PAM) techniques, each signal is represented and its amplitude level is determined by a transmitted symbol. For example, in 16-QAM (Quadrature Amplitude Modulation), typical symbol amplitudes of ±1 and ±3 are utilized in each quadrature channel. For digital communications systems, efficient use of bandwidth is crucial when dealing with time dispersive channels as is common with wireless systems. In these types of systems, whenever there is a distortion of the signals due to preceding or following pulses, normally referred to as pre-cursors and post-cursors, respectively, the amplitude of the desired pulse is affected due to superimposition of the overlapping pulses. This phenomenon is known as intersymbol interference and is an impediment to high-speed data transmission, especially in systems that are constrained by limited bandwidth.

One way to minimize the effects of intersymbol interference is to use an equalizer. Fixed equalizers are designed to be effectively operated between an upper and lower bound between which the channel is expected to deviate. Whenever these limits are exceeded, the equalizer ceases to operate effectively. Hence there has to be a certain degree of precision when channel equalization is employed, and fixed equalizers are implemented. There are adaptive equalizers (i.e. continuous) that track dynamic channel dispersion, and make continuous adjustments to compensate for such intersymbol interference. This provides some improvement in performance over the fixed equalizer.

Incorporation of the equalizer into some communication systems does not come without penalty. In wireless systems, for instance, insertion loss becomes a critical factor if the equalizer is present and the associated impairment does not occur. The main purpose of equalizer implementation is to enhance the information bearing capability of the communication system with the design objective of asymptotically approaching the capacity bounds of the transmission channel. Consequently, the use of the equalizer can be regarded as one instance of an array of possibilities that may be implemented to enhance the bit rate of a communication system design.

SUMMARY OF THE INVENTION

In accord with the invention, a method and apparatus is provided that increases the bits per baud beyond rates that are achievable with digital signaling systems at present without a necessity to increase the bandwidth of the channels. This is done by significantly reducing the effects of intersymbol and interchannel interference by a judicious choice of the signaling pulse shapes. In particular prolate pulses are used to extend channel capacity and reduce interference. By use of orthogonal axes that span the signal space combined with water filling techniques for efficient allocation of transmission energy based on the noise distribution, the information content can be increased without increase in bandwidth.

The signaling space is spectrally decomposed to support the simultaneous transmission of multiple signals each with differing information bearing content, and being orthogonal are non-interfering. Signals are constructed as complex sets and are generally represented with axial coordinates all orthogonal to one another within the complex plane. The real axis is termed the in-phase (I) component and the imaginary axis is termed the quadrature (Q) component. These components for a signal define a spanning vector in the signal space.

DETAILED DESCRIPTION

Spectral efficiency in digital systems is to a large extent a function of the wave shapes of the signal that are used to carry the digital information. There are tradeoffs between time limitations and frequency limitations. These two requirements generally have a flexible relationship. The characteristics of prolate pulses may be chosen to limit spectral energy dispersion thereby permitting more signaling channels for a given bandwidth. These advantages become readily apparent with an analysis of the prolate pulse spectral performance. In particular the Fourier transform of the waveform is very band-limited. Proper selection of signal space such as axes or spectral vectors representing signal coordinates are very important. If signals are orthogonal to one another, transmission techniques utilizing methods of water filling may be implemented with significant increased efficiency. The technique of water filling is discussed in "Multicarrier Modulation for Data Transmission: An Idea Whose time Has Come" J. A. C. Bingham "IEEE Communications" May 1990, pp. 5–14 incorporated by reference.

Figure 4:
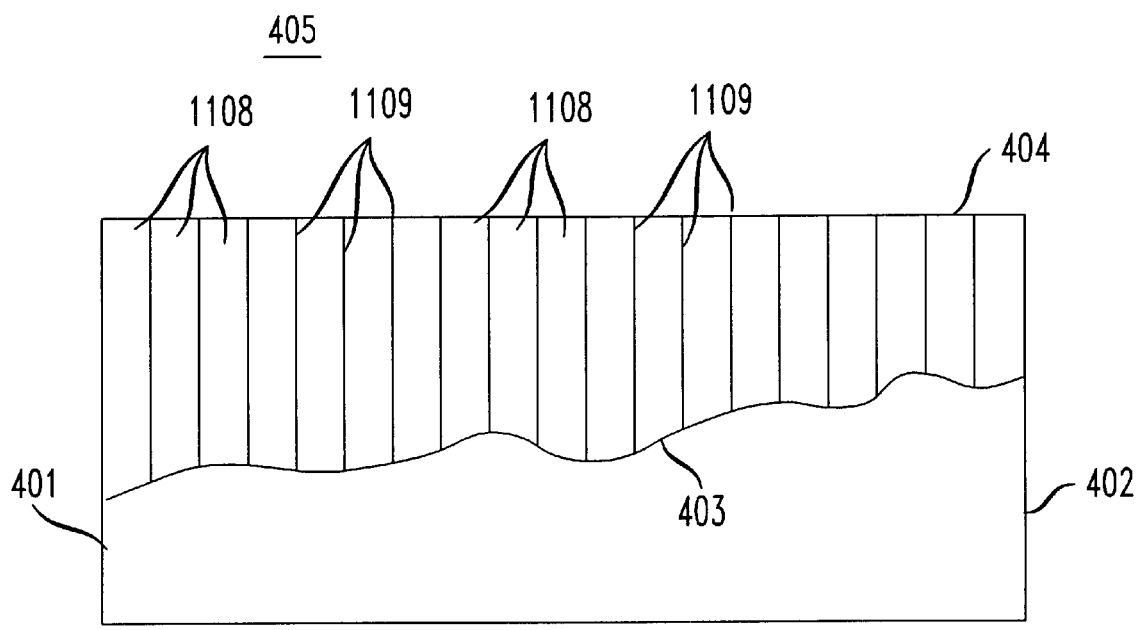
FIG. 4 is a graph illustrating the application of water filling to the present invention.

An illustration of water filling may be ascertained from the graph of FIG. 4. A bandwidth of a channel is defined by the marks 401 and 402 on the horizontal axis. A curve 403 defines the noise level produced as seen by a receiver. The energy level which the channel can transmit is defined by the horizontal level 404. The area 405 bounded by the curve 403 and energy level 404 may be "water filled" by data signals. The data acceptance area 405 of the band is divided into sections 408 by vertical dividers 409. The signal data is inserted into a section until the added data and noise in that section reaches the energy level limit. This filling combined with the orthogonal nature of the data signals inserted in the sections permits the increase in the data capacity of the channel.

Consider a trigonometric polynomial $p_i(t)$ defined as follows:

$$p_i(t) = \sum_{n=-N}^{N} a_{in} e^{jn\pi t} \quad (1)$$

Figure 1:
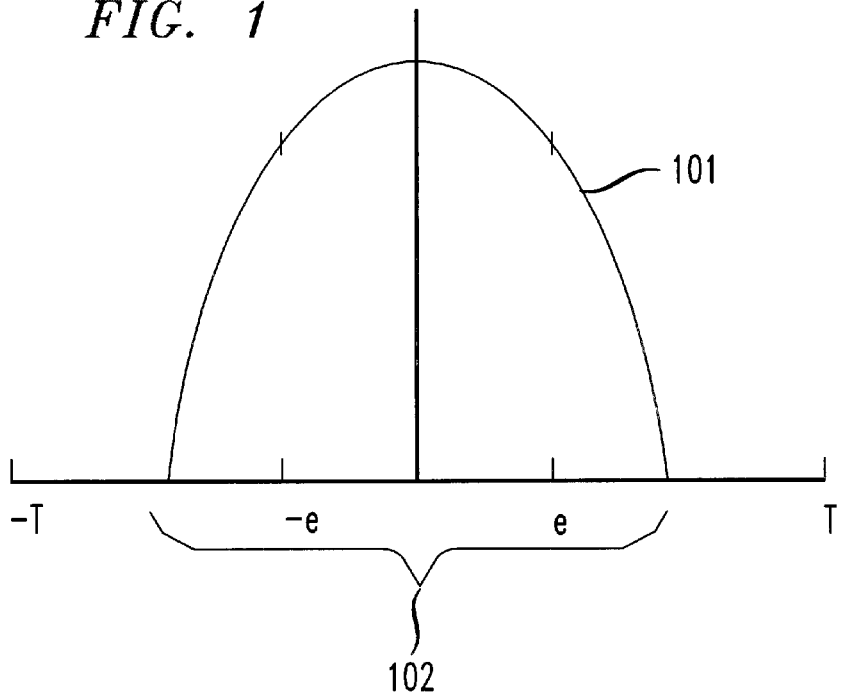
FIG. 1 is a graph depicting the concentration of energy in a prolate pulse interval.

In equation (1) the period may be chosen to be 2 by suitable scaling of t. The coefficients $a_{in}$ can be obtained by an optimization process, the objective of which is to obtain a spectrally efficient pulse. The process may be regarded as a scheme in which the energy of the pulse is concentrated in the interval $[-\epsilon, \epsilon]$. This is shown in FIG. 1 where a more or less generic pulse 101 is shown and the constraining interval 102 is indicated. The optimization process is a transmission pulse design problem, and a particular mathematical approach for achieving this objective is now described. In general, optimal communication system design requirements often necessitate the transmission of spectrally efficient pulses in order to minimization both intersymbol interference and interchannel interference where application requires segmented spectrum utilization.

Based on the specified format in equation (1), it can be shown that the coefficients $a_{in}$, of $p_i(t)$ satisfy the following system of equations:

$$\sum_{m=-N}^{N} \frac{\sin(n-m)\pi\epsilon}{(n-m)\epsilon} a_{im} = \lambda a_{in}, \quad n = -N, -N+1, \cdots N. \quad (2)$$

Equation (2) may be rewritten in the form, $$S\bar{a}_i = \lambda_i \bar{a}_i \quad (3)$$

where the coefficients $S_{nm}$, of the matrix S defined by equation (3), and eigenvector $\bar{a}_i$ are given by, $$S_{nm} = \frac{\sin(n-m)\pi\epsilon}{(n-m)\epsilon} \quad (4)$$

and $$\bar{a}_i = [a_{-Ni}, a_{(-N+1)i}, \ldots a_{0i}, \ldots, a_{(N-1)i}, a_{Ni}]^t \quad (5)$$

where t denotes transpose. The matrix S is real, symmetric, and positive definite with other mathematical properties of interest to the development, as now discussed. There are thus 2N+1 real eigenvalues $\lambda_i$ which satisfy equation (3) and which may be ordered such that:

$$\lambda_1 > \lambda_2 > \ldots > \lambda_{2N+1} \quad (6)$$

For each eigenvalue $\lambda_i$, there is an associated eigenvector $\bar{a}_i$, whose coefficients may be used to form the trigonometric function defined in equation (1). The eigenvectors of the matrix S may be normalized to have unit energy. And because of the orthogonality of the eigenvectors of symmetric matrices, their dot products $\bar{a}_i \cdot \bar{a}_j$ satisfy the following relationship, $$\bar{a}_i \cdot \bar{a}_j = \sum_{n=-N}^{N} a_{in} a_{jn} = \delta_{ij}, \quad (7)$$

where $\delta_{ij}$ is the Kronecka delta function. Because of equation (3) and equation (7), it can be shown that functions of the form of equation (1) whose coefficients are those of the eigenvectors of the matrix S as defined in equation (4), the following relationships holds:

$$\frac{1}{2}\int_{-1}^{1} p_i(t) p_j(t) dt = \delta_{ij}, \text{ and,} \quad (8)$$

$$\frac{1}{2}\int_{-\epsilon}^{\epsilon} p_i(t) p_j(t) dt = \lambda_i \delta_{ij} \quad (9)$$

Functions so formed may be described as a discrete prolate.

With the background material discussed above, a particular method of communicating digital information using the functions $p_i(t)$ defined earlier is now presented. Again, in view of equation (6), there are 2N+1 eigenvectors that satisfy equation (3). The vectors together form a spanning set for the vector space defined by the matrix S. Define D to be the dimension of the associated vector space. Then D is given by:

$$D = 2N+1 \quad (10)$$

Note that D is a system design parameter, and is a function of N. By analogy, $\{p_i(t)\}$ form a spanning set for the signal space associated with the matrix S, and this signal space is also D dimensional. Consider the construct:

$$x_i(t) = \sum_{k=-\infty}^{\infty} I_k p_i(t - kT) \quad (11)$$

Generalizing and using equation (8), one can show that the following holds:

$$\frac{1}{2T}\int_{-T+kT}^{T+kT} x_i(t) p_j(t) dt = \delta_{ij} I_k \quad (12)$$

Equation (12) is of critical importance to the invention. The implications are that if a function of the form equation (11), for a specific value of i, is transmitted over a communication channel, then the alphabet $I_k$ will only be uniquely determined in an interval defined by k if the corresponding $p_i(t)$ is used as the receiving filter. If a function of the form of equation (12), for a specific value of i, is transmitted over a communication channel, and $p_j(t)$ is used as the receiving filter, then such a function, for all intents and purposes, will be virtually non-existent. Thus in order to extract the information content of a signal whose format is given by the equation (11), the signaling pulse must be matched at the receiver. In anticipation of making reference to Cartesian space, the format of equation (11) is used in the construction of $y_i(t)$. We have:

$$y_i(t) = \sum_{k=-\infty}^{\infty} Q_k p_i(t - kT) \quad (13)$$

where again $Q_k$ is the alphabet to be transmitted. It is clear that (13) also satisfies a relationship similar to equation (12). Equations (11) and (13) may now be used to quadrature modulate a carrier in the final part of the transmission signal synthesis. Define $s_i(t)$ by:

$$s_i(t) = x_i(t)\cos(2\pi f_c t) - y_i(t)\sin(2\pi f_c t) \quad (14)$$

Thus the signals are constructed as complex sets and are generally represented as vectors within the complex plane.

The real axis is termed the in-phase (I) component and the imaginary axis is termed the quadrature (Q) component.

As indicated by equation (10), there are D such possible constructs. Because of the orthogonality of the building blocks $\{p_i(t)\}$ discussed earlier, $\{s_i(t)\}$, being linear combinations of a single $p_i(t)$ for each i, are themselves orthogonal, forming a spanning set for the signal space defined over the channel band-limited by W=1/2T. That is to say, each such signal $s_i(t)$ may be regarded as an orthogonal "finger" over which the alphabet $\{I_k, Q_k\}$ may be independently transmitted. Thus equation (14) can be used to increase the bit rate of the communication channel without bandwidth expansion. Of course coding and equalization may be added to improve fidelity.

The parameters e and N determine the spectral shape of the transmission pulses $p_i(t)$. In general e will be used to determine the compactness of fit within the signaling period, while N determines the peaking and roll-off. It is important for N to be fairly large (N≦10) as there are at least two benefits to be gained in this regard. Firstly, large N contribute to better roll-off characteristics which directly minimize intersymbol interference. Secondly, as can be seen by equation (10), large N contribute directly to an increase in the dimension of the signaling space, providing more pulsing functions that can be used to increase the capacity of the transmission system design. However, these benefits must be balanced by the fact that the tighter peaks that are made possible by larger N are likely to place greater implementation constraints on the receiver, to the extent that more accurate symbol timing shall be required to retrieve the encoded digital information.

On the other hand, the specification of e will play a significant role in the utilization of the total channel resource. As will be discussed further in the sequel, efficient utilization of available signaling power generally requires that it may not be allocated equally across the entire channel. Thus, e may be the result of a process in which optimal allocation of energy across the entire channel is required, and in which, for implementation simplicity, the pulses across the various segments are consistent. In this case, e will play a critical role in the minimization of interchannel interference. A good range for e shall be e<0.5.

In general, the range of the alphabet $\{I_k Q_k\}$ determines the number of levels M that may be reasonably distinguished at the receiver, with noise, crosstalk, and interference playing a critical role in the determination of what may be regarded as reasonable. Conventional modulation techniques, such as QAM for instance, may be referenced, and the value of M shall be determined in an optimization process in which the power is held constant, and the bit rate is maximized for a given BER constraint. Given M, the information bearing capacity C of the transmitter is computed in a straightforward manner. We have, $$C = \frac{\log_2 M}{T} \quad (15)$$

where C is given in units of bits/s. However, equation (15) holds only for the one-dimensional case. That is, only when one signal of M reasonably distinguishable levels is transmitted in a channel band-limited by W, this case being typical of most communication systems in use today. However, given the prospects implied by equation (14), there are D such possibilities using the spectral decomposition referenced earlier, and the limiting value of C is now given by:

$$C_{\lim} = \frac{D \log_2 M}{T} \quad (16)$$

The art of optimal communication systems design is generally one in which various signal-processing techniques are comprised to asymptotically approach theoretically established channel capacity limits. Transmission rates may further be optimized if a process known as water filling is implemented. With the implementation of water filling, the available signaling power is allocated to the communication channel in a manner related to the noise spectral density, with the objective of maximizing resource utility. It may be regarded as a process in which the squander of the available signaling energy is avoided. Let the noise be Gaussian, with power spectral density given by N(f), with H(f) being the associated complex transfer function of the channel. Then, in order to make efficient use of the available signaling power S, the optimal channel input power is given by:

$$S = \int_{f \in \Omega} B - \frac{N(f)}{|H(f)|^2} df \quad (17)$$

where the region of integration $\Omega$ is defined by:

$$\Omega = \left\{ f : \frac{N(f)}{|H(f)|^2} \leq B \right\} \quad (18)$$

In equations (17) and (18) B is an average input power constraint. Fundamentally, input power is limited only to areas of the channel in which the noise is not excessive, and is spectrally shaped by the contour of the noise distribution. Finally, B provides the upper bound.

From a practical standpoint, the optimal allocation of signaling power is best achieved by channel segmentation. Then, the available signaling power must be distributed to the various segments in a manner such that the available link margin is not exceeded. There exist in the literature a variety of optimal loading algorithms through which the required energy distribution may be accomplished. A good example may be found in the patents "Ensemble Modem Structure For Imperfect Transmission Media" U.S. Pat. Nos. 4,679,227, 4,731,816 and 4,833,706.

Figure 2:
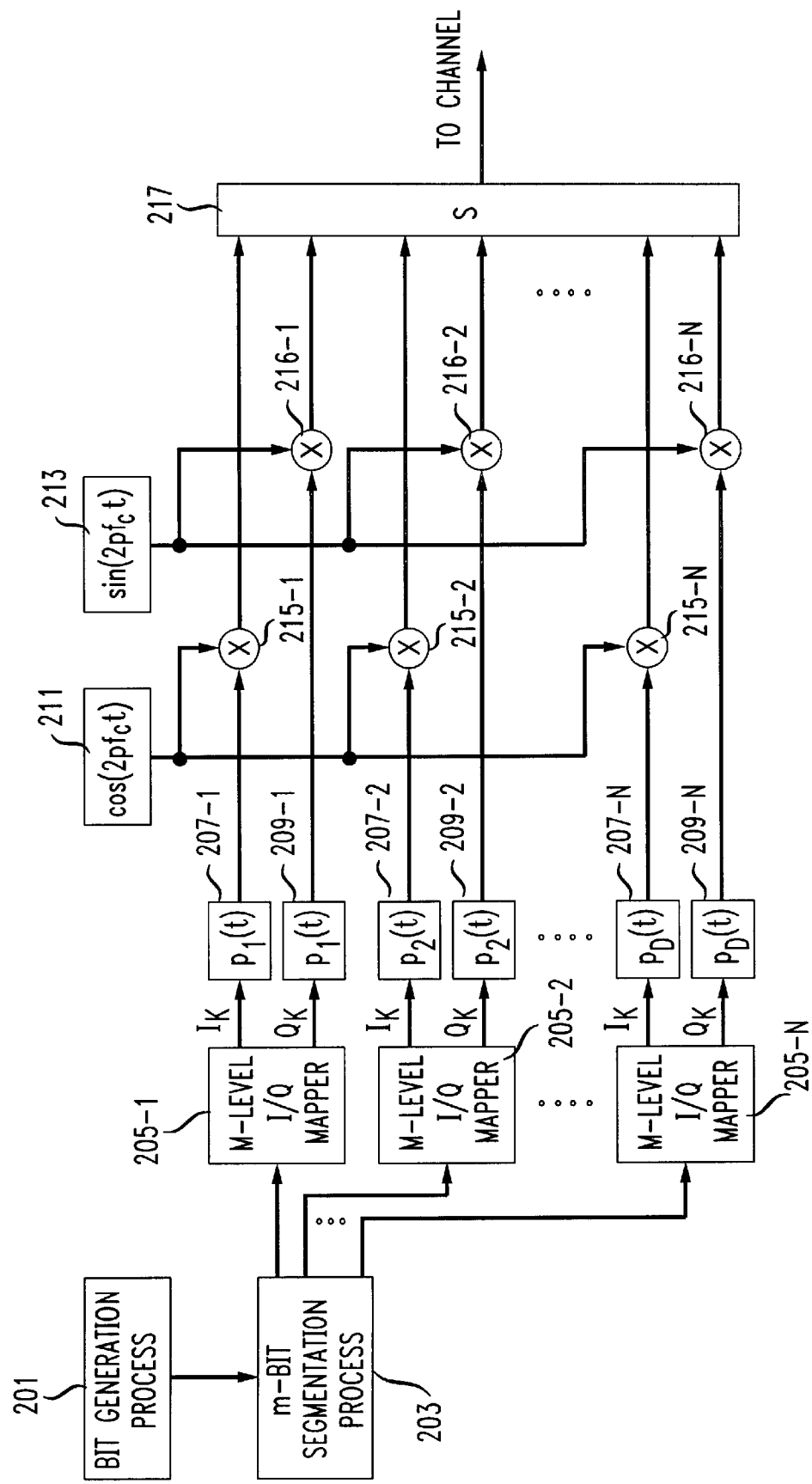
FIG. 2 is a block schematic of a Single Segment Discrete Prolate Transmitter.

A block diagram of the transmitter building block is shown in FIG. 2. Water filling being an integral part of the design, the transmitter is optimized for different segments (see FIG. 4) of the channel. The bit generation process 201 may optimally be the output of a convolutional encoder. The m-bit segmentation process 203 is a serial to parallel operation which divides the incoming bits into m-bit blocks to be simultaneously applied to each "finger" of the transmitter, a finger in this regard being one of the spectral vectors into which the signal space is resolved. Note that m may not necessarily be constant, but can be determined based on joint optimization of the rate, available signal power, and probability of error. The diagram shows M-level I/Q mapping functional blocks 205-N. At these points the m-bit blocks are translated to the $I_k$ and $Q_k$ values in blocks 207-N and 209-N that are used to generate the discrete prolate pulses. The pulses are used to modulate the carrier supplied by carrier source 211 and 213 in mixers 215-N and 216-N, and the results are finally summed in summer 217 by water filling a transmission bandwidth and transmitting the modulated carrier for output onto the output channel.

Figure 3:
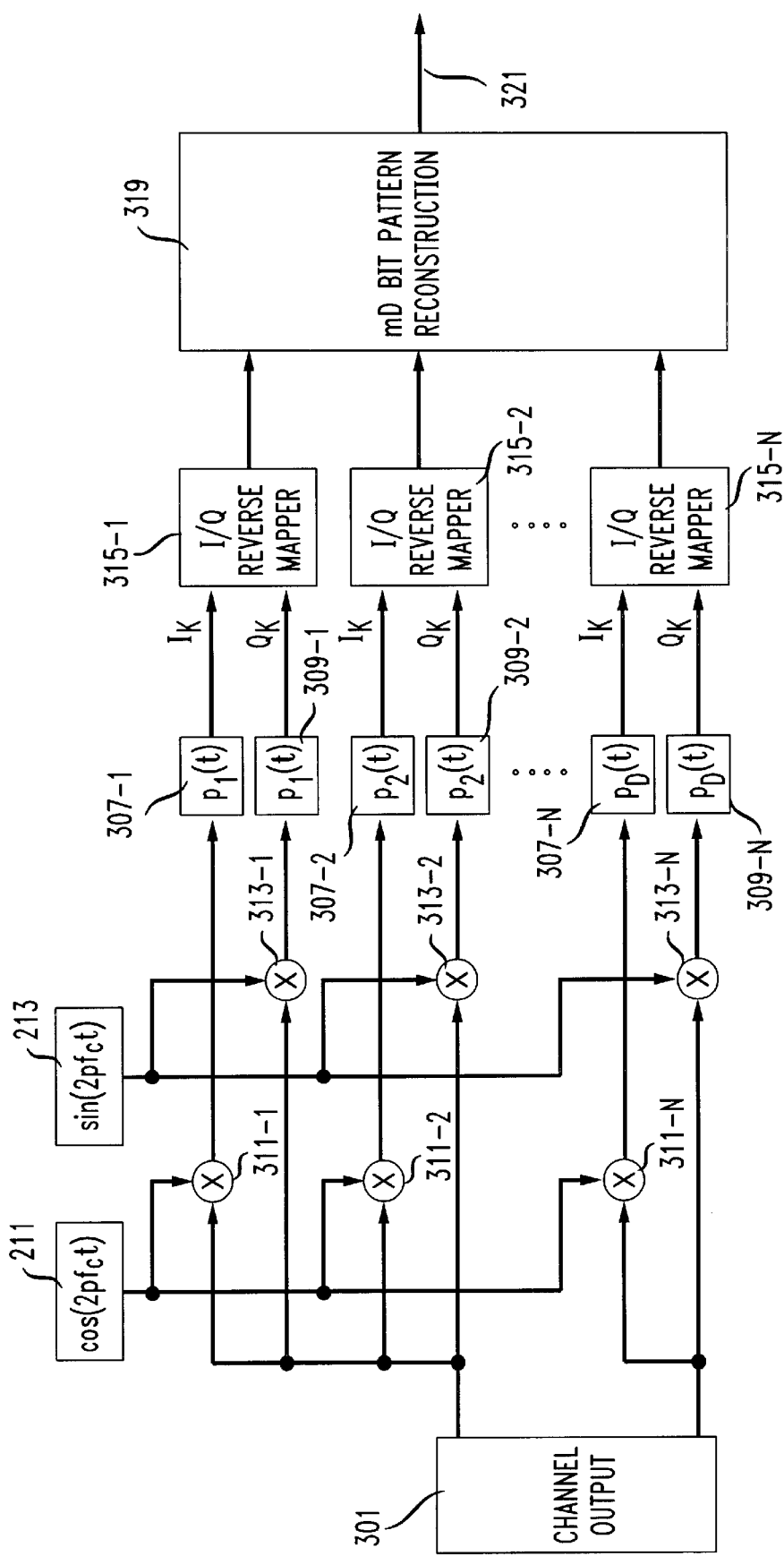
FIG. 3 is a block schematic of a Single Segment Discrete Prolate Receiver.

The associated receiver structure is shown in FIG. 3. As discussed above the key to retrieving the bits that were sent in a particular dimension is the use of a lowpass eigenfilter for that dimension. The discrete prolate pulses are thus used to form a lowpass orthogonal filter bank for extracting the bit information from each dimension. The demodulated $I_k$ and $Q_k$ values finally go through a reverse mapping process, after which the original block of bits is reconstructed.

In the receiver of FIG. 3 the channel output is received as indicated by the block 301. This channel output is connected to a plurality of mixers 311-N and 313-N and are mixed with cosine and sine signals, respectively. These mixed signals are demodulated in the orthogonal filterbank containing filters 307-N and 309-N. I/Q reverse mapping is performed in inverse mappers 315-N to recover the segmented bits and the originally transmitted bit pattern is reconstructed in block 319 and output on lead 321. While discrete blocks are illustrated, the processes are stored program processes which are performed independently of block identification.

Synchronousness being of critical significance to the design of telecommunication systems, reference is now made to the fact that in the construction of FIGS. 2 and 3, this requirement is stipulated. Thus, in a complete embodiment of the present invention, methods of carrier tracking and symbol rate recovery shall be implemented. There are various procedures well documented in the literature to accomplish these operations. FIGS. 2 and 3 capture the essence of the salient features of the present invention.

Recall that in equation (2) $\epsilon$ was used to determine the pulse efficiency. Thus, in a preferred embodiment equation (9) may be used to shorten the length of the filtering process, in an effort to seek implementation efficiency. Filtering must then be normalized by a factor of $1/\lambda$ for each finger. In this case, keeping jitter to a minimum will be a critical issue.

In present-day communication systems, because of the inefficiencies that occur with the application of a single signal for information bearing, the implementation of complex equalization structures is imperative to achieve the most efficient use of the channel. With the implementation of the design discussed herein, the equalizer shall effectively be reduced to a simple scaling function.

The invention presented herein was described in light of a preferred embodiment. It should be understood that such preferred embodiment does not limit the application of the present invention. Persons skilled in the art will undoubtedly be able to anticipate alternatives that are deemed to fall within the scope and spirit of the present application.

What is claimed is:

1. A method for transmitting a high speed signal via a modem comprising the steps of:
    segmenting a serial bit stream into m-bit blocks;
    translating said m-bit blocks into $I_k$ and $Q_k$ Cartesian values;
    converting each of said $I_k$ and $Q_k$ Cartesian values into $I_k$ and $Q_k$ prolate pulses, respectively;
    modulating an $I_k$ and $Q_k$ carrier by respective $I_k$ and $Q_k$ prolate pulses to obtain orthogonal signals; and
    summing said modulated carriers by water filling a transmission bandwidth and transmitting them on a transmission channel.

2. The method of claim 1, wherein the step of converting each of said $I_k$ and $Q_k$ Cartesian values into prolate pulses comprises generating prolate pulses for each $I_k$ and $Q_k$ dimension, such that said each $I_k$ and $Q_k$ dimension is orthogonal to other $I_k$ and $Q_k$ dimensions.

3. The method of claim 1 wherein the step of summing by water filling includes dividing a band into sections and individually filling each section.

4. A high speed discrete prolate transmitter comprising:
    an encoder for encoding a signal to generate bits;
    a means for segmenting said generated bits into m-bit blocks based on channel parameters so that capacity of each related sub-channel may be individually optimized by combining signal energy and noise energy to fill the sub-channel;
    a M-level mapper for translating said m-bit blocks into $I_k$ and $Q_k$ dimensions;
    a means for generating corresponding $I_k$ and $Q_k$ prolate pulses for each $I_k$ and $Q_k$ dimension;
    a modulator for modulating each $I_k$ and $Q_k$ dimension via its corresponding $I_k$ and $Q_k$ prolate pulse to generate a series of modulated carriers; and
    a summer for adding said modulated carriers and transmitting them over a transmission channel.

5. The high speed discrete prolate transmitter of claim 4, wherein said means for generating corresponding $I_k$ and $Q_k$ prolate pulses for each $I_k$ and $Q_k$ dimension comprises a means for generating $I_k$ and $Q_k$ prolate pulses that are orthogonal.

* * * * *